United States Patent [19]

Marans et al.

[11] 4,165,411
[45] Aug. 21, 1979

[54] FLAME RETARDANT URETHANE AND METHOD

[75] Inventors: Nelson S. Marans; Clifton L. Kehr, both of Silver Spring; Robert M. Murch, Ashton, all of Md.

[73] Assignee: W. R. Grace & Co., New York, N.Y.

[21] Appl. No.: 834,927

[22] Filed: Sep. 20, 1977

Related U.S. Application Data

[63] Continuation-in-part of Ser. No. 588,092, Jun. 18, 1975, abandoned, which is a continuation-in-part of Ser. No. 404,824, Oct. 9, 1973, abandoned.

[51] Int. Cl.$^2$ .............. C08K 5/52; C08K 5/53; C08K 5/51
[52] U.S. Cl. ............................................. 521/107
[58] Field of Search ............... 521/107; 260/2.5 AJ, 260/2.5 AD, 2.5 AK

[56] References Cited

U.S. PATENT DOCUMENTS

| | | | |
|---|---|---|---|
| 3,157,613 | 11/1964 | Anderson et al. | 521/107 |
| 3,262,894 | 7/1966 | Green | 260/2.5 AJ |
| 3,330,783 | 7/1967 | Piechota et al. | 521/107 |
| 3,385,801 | 5/1968 | Birum et al. | 521/107 |
| 3,400,085 | 9/1968 | Kujawa et al. | 521/107 |
| 3,423,343 | 1/1969 | Barnett | 260/45.9 NP |
| 3,677,899 | 7/1972 | Denk et al. | 260/37 N |
| 3,810,851 | 5/1974 | Norman | 260/2.5 AJ |
| 3,897,372 | 7/1975 | Kehr | 260/2.5 AJ |
| 4,066,578 | 1/1978 | Murch | 260/2.5 AG |

FOREIGN PATENT DOCUMENTS

7413209  4/1978  Netherlands .............. 260/2.5 AD

OTHER PUBLICATIONS

*Kunstoff*-67(1977)1, pp. 14 to 16.
Sobolev, Flammability of solid Plastics, 1974, Hilado pp. 263 to 275.
Lyons, Chemistry and Uses of Fire Retardants, 1970 pp. 345 to 371.

*Primary Examiner*—V. P. Hoke
*Attorney, Agent, or Firm*—Richard P. Plunkett; Edward J. Cabic

[57] ABSTRACT

The invention disclosed relates to a new polyurethane composition having improved flame retardance and to a method for preparing same. The present composition includes a hydrophilic polyurethane having alumina hydrate and a phosphorus containing compound disposed therein.

27 Claims, No Drawings

FLAME RETARDANT URETHANE AND METHOD

This application for United States Letters Patent is a continuation in part of application Ser. No. 588,092, filed June 18, 1975 which is a continuation-in-part of application Ser. No. 404,824, filed Oct. 9, 1973, all now abandoned.

BACKGROUND OF THE INVENTION

This invention relates to a new polyurethane composition having improved flame retardancy and to a method for preparing such compositions.

Numerous attempts have been made in the prior art seeking solutions to improving flame retardancy for polyurethane compositions. Typically, these attempts have provided compositions which only limitly improve the flame retardant capacity while greatly increasing the cost of the final composition. It has now been found, however, that by practice of the present invention, there results a new improved flame retardant polyurethane which is easily prepared both commercially and economically.

Hydrophilic foams similar to those of the present invention are described in U.S. patent application Ser. No. 805,458 filed June 10, 1977 now U.S. Pat. No. 4,137,200 issued Jan. 30, 1979, wherein large amounts of water containing relatively large amounts of alumina hydrate are combined with hydrophilic urethane prepolymers under foam-forming conditions. The application also describes addition of fire-retardant additives to hydrophilic foams. Applicants are also aware of U.S. Pat. No. 3,262,894 describing the synergistic effect of alumina hydrate and phosphorus additives in urethane foams. The compounds are said to make said foams self-extinguishing under ASTM D1692-59T. This effect is achieved by employing from 11 to 30% by weight of the alumina hydrate, the weight percentage being based on the total dry foam weight.

DESCRIPTION OF THE INVENTION

By the present method, flame retardant polyurethanes may be prepared having hydrophilic crosslinked polyurethane structures by reacting a particular isocyanate capped polyoxyethylene polyol with large amounts of an aqueous slurry of an aluminum hydrate and a phosphorus containing compound. The thus generated polyurethane having aluminum hydrate and phosphorus containing additive uniformly disposed throughout is found to have improved flame retardancy.

While alumina trihydrate is the preferred flame-retardant additive, other materials can be used provided they exhibit a substantial endotherm when heated at the approximate temperature range that causes decomposition of the polyurethane. The term "polymer decomposition" is intended to designate the evolution of volatile fragments following the absorption of thermal energy by the polymer. This process has been described by S. L. Madorksky in his monograph on the subject, "Thermal Degradation of Organic Polymers", Interscience Publishers, New York, N.Y. (1964).

The hydrophilic polyurethanes described herein generally decompose upon heating when the polymer temperature is in the 200° to 300° C. range. Those endotherm-producing additives that can be used to best advantage exhibit a maximum endotherm in a similar temperature range, i.e. about 130° to about 380° C. Due to the rapid rate at which the endotherm is measured (i.e. differential thermal analysis, sample size of about 20 mg., heating rate about 25° C./minute), the preceding range is an approximate range. For example, the decomposition of the additive is believed to be responsible for the endotherm yet said decomposition (as measured by thermal gravimetric analysis) generally occurs at a lower temperature than the endotherm. By additive decomposition is meant the thermally induced surrender of chemically or physically bonded molecules (e.g. solvated water, tetrahydrofuran, pyridine) or the fragmentation of the additive into two or more volatile species. Frequently, such additives are hydrated inorganic salts or oxides. Salts containing cations such as ammonium or anions such as carbonates or oxalates (that evolve gaseous fragments when heated) are preferred. The endotherm is the heat energy required to raise the temperature of a sample 1° C.

The decomposition temperature of the additives is measured by thermogravimetric balance using the DuPont 950 apparatus. The magnitude of the endotherm produced by additive decomposition is measured in a separate test by differential thermal analysis on the DuPont 900200 DTA cell.

Alumina trihydrate evolves water upon heating and the endotherm for this process occurs between 235° and 400° C. The heat endotherm is approximately 0.3 kcal./g. for this process. Generally, the magnitude of this endotherm will be above 0.1 kcal./g. for acceptable endothermic additives and is rarely higher than 0.5 kcal./g.

Representative examples of suitable endothermic additives are listed in the following table. The endotherm temperature range and relative magnitude of the endothermic decomposition (in relation to alumina as the reference sample) were measured using a DuPont 900 Thermal Analyzer and a DuPont 900200 DTA cell. The endothermic behaviors are reported $Al_2O_3 \cdot 3H_2O$. The "Relative Magnitude of Endotherm" is the total endotherm of the sample compared with the total endotherm of alumina, the reference sample. The test is carried out by heating the test sample and reference sample (sample size=20 mg.) at 25° C./minute from 20° C. to about 500° C. Endotherms over 500° C. are not included in calculating the "Relative Magnitude of Endotherm". The "maximum endotherm temperature" is the temperature at which maximum heat absorption occurs in carrying out the endotherm test using the DuPont 900200 DTA cell.

| | Endotherm Temperature | | | |
|---|---|---|---|---|
| Additive | Start | Maximum | End | Relative Magnitude of Endotherm |
| Alumina trihydrate | 235 | 325 | 400 | 1.0 |
| Ammonium oxalate monohydrate | 130 | 240 | 301 | 1.41 |
| Calcium oxalate monohydrate | 70 | 130 | 300 | 1.03 |
| Cobalt oxalate dihydrate | 120 | 240 | 445 | 1.0 |
| Ceric Carbonate pentahydrate | 35 | 170 | 290 | 0.69 |
| Magnesium ammonium phosphate | 80 | 200 | 300 | 1.0 |
| Cobalt phosphate octahydrate | 35 | 150 | 300 | 1.44 |
| Cobalt sulfite pentahydrate | 40 | 380 | 440 | 0.53 |

In the following description of the invention, the ranges, reaction conditions and other parameters set forth for alumina hydrate are to be understood as applying also to the other additives specified above which can be used in place of alumina hydrate.

Specifically, the present invention is a flame-retardant hydrophilic polyurethane foam comprising the reaction product of: (a) a hydrophilic polyoxyalkylene urethane prepolymer; (b) alumina hydrate; (c) phosphorus fire-retardant compound; and (d) water. A sufficient amount of water is employed so that the $H_2O$ Index Value is from about 1,300 to about 78,000. Based on the dry foam weight, from about 2 to 20 weight percent (preferably 4–20%) of said foam is phosphorus compound and from about 45 to 70 weight percent is alumina hydrate. Generally, at least 90% of the remaining portion of the foam is the reacted urethane prepolymer although this percentage can be lower to accommodate large amounts of other additives, i.e. the amount of prepolymer is not critical so long as the $H_2O$ Index Value is complied with and a sufficient amount of prepolymer is present to provide the structural features deemed desirable for a particular use.

Recent studies have raised the possibility that certain halogenated phosphorus compounds may be hydrolizable to form relatively low molecular weight halogenated alcohols which may in turn pose health hazards. Therefore, it is preferred that the phosphorus compound be non-halogenated, e.g. ammonium polyphosphate, dimethoxy methylphosphonate, dimethylhydroxyethylphosphonate, dimethylhydroxyisopropylphosphonate, and red phosphorus.

The term "dry foam weight" means the total weight of reagents employed in preparing the foam but not including the weight of any water employed.

Generally, the present polyurethane composition includes a hydrophilic polyurethane structure having uniformly dispersed therein an aluminum hydrate additive and a phosphorus containing additive, both additives being effectively used in combination.

Because the additives employed herein must be uniformly dispersed in the polyurethane structure, it is advantageous to use a hydrophilic polyurethane prepared by using relatively large amounts of water or aqueous reactant. In this manner, the present additives can be introduced during the reaction step and thereby insure uniform distribution.

One group of polyurethanes useful herein are disclosed in co-pending, commonly assigned U.S. patent application Ser. No. 250,012 filed May 3, 1972, now abandoned, the effective portions of the disclosure of which are incorporated herein by reference. Generally, these foams are crosslinked polyurethane foams prepared by using a capped polyoxyethylene glycol reactant and massive amounts of water.

The polyoxyethylene polyols used in this invention are water soluble reaction products derived from the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges are described subsequently.

Particularly useful foams may be prepared by first capping a polyoxyethylene polyol with a polyisocyanate such that the capped product has a reaction functionality greater than two. Thereafter, the resin is reacted by combining with water such that a crosslinked foam results. It is also possible to use a capped polyoxyethylene polyol having a functionality approximating 2 in which case a polyfunctional reactive member such as one having three, or up to about 8 reactive amine, hydroxy, thiol, or carboxylate sites per average molecule is included to form a three dimensional crosslinked product. Useful polyfunctional reactive members include materials such as diethylenetriamine, triethylenetetramine, tetraethylene-pentamine, polyethyleneimine, glycerol, trimethylolpropane, pentaerythritol, tolylene-2,4,6-triamine, ethylenediamine, trimethylenediamine, tetramethylenediamine, pentamethylenediamine, hexamethylenediamine, aminoethanol, diethanolamine, hydrazine, triethanolamine, benzene-1,2,4-tricarboxylic acid, nitrotriacetic acid, citric acid, 4,4',-methylenebis (p-chloraniline), and the like.

Polyoxyethylene polyol used as a reactant in preparing the capped product to be foamed may have a weight average molecular weight of about 200 to about 20,000, and preferably between about 600 to about 6,000, with a hydroxyl functionality of about 2 or greater, preferably from about 2 to about 8.

Polyoxyethylene polyol is capped by reaction with a polyisocyanate or polyisothiocyanates. The capping materials include PAPI (a polyaryl polyisocyanate as defined in U.S. Pat. No. 2,683,730), tolylene diisocyanate, triphenylmethane-4,4',4'',-triisocyanate, benzene-1,3,5-triisocyanate, toluene-2,4,6-triisocyanate, diphenyl-2,3,3'-triisocyanate, hexamethylene diisocyanate, xylene diisocyanate, naphthalene-1, 5-diisocyanate, xylene-alpha, alpha' diisothiocyanate, 3,3'-dimethyl-4,4'-biphenylene diisocyanate, 3,3'-dimethoxy-4,4'-biphenylene diisocyanate, 2,2'5,5'-tetramethyl-4,4'-biphenylene diisocyanate, 4,4'-methylenebis (phenylisocyanate), 4,4'-sulfonylbis (phenylisocyanate), 4,4'-methylene diorthotolylisocyanate, ethylene diisocyanate, ethylene diisothiocyanate, trimethylenediisocyanate and the like.

Capping of the polyoxyethylene polyol may be effected using either about stoichometric amounts of reactants or an excess of isocyanate to insure complete capping of the polyol.

To effect foaming and preparation of the crosslinked network polymer, the component including the isocyanate capped polyoxyethylene polyol having a functionality about 2 or greater is simply combined with water by most any suitable means such that a crosslinked hydrophilic foam results.

Oxyalkylene Prepolymers

Polyether polyurethane prepolymers employed are hydrophilic, i.e. at least 40 mole % of the oxyalkylene units in the prepolymer backbone are oxyethylene units with the balance being oxypropylene, oxybutylene or other oxyalkylene units. In the resulting polyurethane foams, the branch-points of the polymer chains are connected by essentially linear polyoxyalkylene chains containing at least 40 mole % of oxyethylene units (excluding initiators at branch-points) as described above. Preferably, the oxyethylene content is from about 60 to 75 mole %. As employed herein the term "polyoxyethylene polyol" is intended to include not only homopolymers of ethylene oxide, but also hydrophilic copolymers of ethylene oxide having a hydroxyl functionality of about 2 or greater and an ethylene oxide content as described immediately above.

As described above, the foams of the present invention are based on the prepolymer technique. Exemplary prepolymers are prepared by capping a polyoxyalkylene polyol with an excess of polyisocyanate, e.g. toluene diisocyanate.

Examples of suitable polyols (to be capped with polyisocyanates) include: (A) essentially linear polyols formed for example by reaction of ethylene oxide with ethylene glycol as an initiator. As discussed above, mixtures of ethylene oxide with other alkylene oxides can be employed so long as the mole percent of ethylene oxide is at least 40 percent. Also as stated, it may be desirable to use crosslinkers with these systems in which case the crosslinker can be included in the water into which the prepolymer is dispersed. Where the linear polyethers are mixtures of ethylene oxide with, e.g. propylene oxide, the polymer can be either random or a block copolymer and the terminal units can be either oxyethylene or oxypropylene. A second class of polyol (B) includes those with a hydroxy functionality of 3 or more. Such polyols are commonly formed by reacting alkylene oxides with a polyfunctional initiator such as trimethylolpropane, pentaerythritol, etc. In forming the polyol B, the alkylene oxide used can be ethylene oxide or mixtures of ethylene oxide with other alkylene oxides as described above. Useful polyols can be further exemplified by (C) linear branched polyfunctional polyols as exemplified in A and B above together with an initiator or crosslinker. A specific example of C is a mixture of polyethylene glycol (m. w. about 1,000) with trimethylolpropane, trimethylolethane or glycerine. This mixture can be subsequently reacted with excess polyisocyanate to provide a prepolymer useful in the invention. Alternatively, the linear or branched polyols, (e.g. polyethylene glycol) can be reacted separately with excess polyisocyanate. The initiator, e.g. trimethylolpropane, can also be separately reacted with polyisocyanate. Subsequently, the two capped materials can be combined to form the prepolymer.

Suitable initiators useful in preparing prepolymers include propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, 1,2,6-hexanetriol, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)methylpentanediol-1,5, 1,1,1-tris[(2-hydroxyethoxy)methyl]ethane, 1,1,1-tris[(2-hydroxypropoxy)methyl]propane, triethanolamine, triisopropanolamine, resorcinol, pyrogallol, phloroglucinol, hydroquinone, 4,6-di-tertiarylbutyl catechol, and catechol.

Although foaming of the present resin reaction is effected simply, it is also possible to add, although not necessary, supplemental foaming materials such as those well known to the artifical sponge foaming art.

Oxygen Index

The significance of adding materials such as aluminum hydrate and a phosphorus containing material may be realized by means of the Oxygen Index Method, a flammability test for plastics, ASTM D-2863-74. This method describes a procedure for determining the relative flammability of cellular plastics by measuring the minimum concentration of oxygen in a slowly rising mixture of oxygen and nitrogen that will just support combustion.

The oxygen index value as used herein is the minimum concentration of oxygen, expressed as volume percent, in a mixture of oxygen and nitrogen that will just support combustion of a material under the conditions of this method.

The minimum concentration of oxygen in a slowly rising mixture of oxygen and nitrogen that will just support combustion is measured under equilibrium conditions of candle-like burning. The balance between the heat from the combustion of the specimen and the heat lost to the surroundings establishes the equilibrium. This point is approached from both sides of the critical oxygen concentration in order to establish the oxygen index.

Another significant and unexpected value of the present polyurethane composition resides in the low smoke density determination. Accordingly, not only does the present composition have a superior flame retardant value, but also this advantage is supplemented by the fact that should some portion of the composition be consumed by flame, the consumption produces very low smoke density relative to other polyurethane structures which do not include the present additives.

Typically, polyurethane compositions which do not include addition of the special combination of additives now found to be essential, have an oxygen index value of about 20 to about 30%, although at 30% the physical properties of such foams are deficient, i.e. such foams are dusty and weak. Also, the 30% value for prior art materials generally represents rigid foams. For flexible foams of the prior art, the oxygen index is generally about 23% or less. In contrast, the polyurethane foams of the invention have oxygen index values up to about 70, e.g. 30–70%, with relatively good physical properties being achieved in the range of 30–50%, especially for flexible foams.

Aluminum hydrates, also commonly called alumina hydrates, or hydrated aluminas, for use herein, are known and are highly refined, inorganic white granular crystalline powders with the chemical formula of $Al_2O_3 \cdot XH_2O$. These materials generally are produced by the Bayer process from bauxite ore and contain small amounts of soda, iron oxide and silica. They are chemically inert and have been used as a filler in organic systems where a filler is normally employed.

The particle size of useful aluminum hydrate ranges from an average particle size of about 0.5 to about 120 microns. Fine particles having a size of about 6.5 to about 9.5 microns are particularly useful. Also, where color of the resultant polyurethane is important, the aluminum hydrate should have a snow-white color grade.

Phosphorus containing compounds useful herein include phosphites, polyphosphites, red phosphorus, phosphate salts (e.g. ammonium phosphates and polyphosphates), organic phosphates, phosphoramides, phosphonates and polyphosphonates, oligomeric derivatives of the above, and mixtures thereof.

Phosphorus Additives

The phosphorus containing additive is included in an amount from about 1 to about 50 parts by weight per 100 parts by weight polymer to be reacted and preferably about 2 to about 50 parts, similar weight basis. Much larger amounts of phosphorous compound can be employed but are not believed to be advantageous.

A number of phosphorus containing additives are available and may be used herein. One useful material is sold under the mark Phosgard C-22-R by Monsanto. This material hs the structural formula:

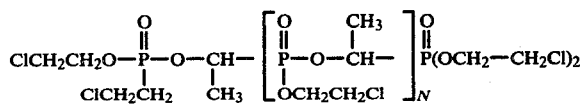

This material having the above formula is insoluble in water and may be dissolved directly in the organic (e.g. prepolymer) phase prior to foaming.

An additional phosphorus containing additive for use in combination with aluminum hydrate to prepare the present polyurethane compositions is ammonium polyphosphate, available under the mark Phoschek P/30 by Monsanto.

Specific phosphorous containing materials which may be useful include, but are not limited to, derivatives of $P_2O_5$, phosphorous acid (e.g. $H_3PO_2$, $H_3PO_3$, $H_4P_2O_5$), phosphoric acid and phosphorous halides; ureaphosphoric acid, monophenyl phosphate and the like; sodium hexametaphosphate, ammonium salts of phosphomomethylated ethers, and the like; monoammonium phosphate, diammonium phosphate and the like; melamine phosphate and salts of phosphorous or phosphoric acid with organic amines; salts of ureaphosphoric acid, monophenyl phosphate, phosphorus pentoxide and chlorides of partially esterified phosphoric acids. Phosphonomethylated ethers, diethyl chlorophosphate, triallyl phosphate, dimethylmethyl phosphonate and similar alkyldialkyl phosphonates, phosphoroxytriamide and the like may also prove useful; alo tris ($\beta$-chloroethyl) phosphate, tris (2,3-dibromoethyl) phosphate, etc.

It is also possible to use materials such as tricresyl phosphate, cresyl diphenyl phosphate, 2-ethylhexyl diphenyl phosphate, trialkyl phosphate and triaryl phosphate as a source of phosphorous for the present polyurethane composition. Another useful source of phosphorous for use herein is that marketed as Fryol 6, a composition having the formula:

$(C_2H_5O)_2P(O)CH_2N(CH_2CH_2OH)_2$

A wide variety of known phosphorous sources are available for use herein. It is important, however, to realize that the phosphorous source must be included along with the aluminum hydrate aditive.

To effect foaming and preparation of the crosslinked network polymer, the component including the isocyanate capped polyoxyethylene polyol having a functionality about 2 or greater is simply combined with a particular aqueous component. For simplicity, this isocyanate capped reaction component will herein be referred to as resin reactant.

The aqueous component may appear as water, a water slurry or suspension, a water emulsion, or a water solution having water soluble materials disposed therein. For convenience, the aqueous component is referred to herein as an aqueous reactant.

Water Level

In contrast to typical polyurethane reactions such as those using catalyst or like promoters where one mole of —NCO is reacted wih one-half mole water, the present reaction proceeds simply with a large but controlled excess of water.

In typical polyurethane reactions known to the art, it is known to employ an excess of water in prepolymer foaming formulations. This has been observed at page 43 in the publication by Saunders and Frisch entitled "Polyurethanes", published by Interscience Publishers, where it is further observed that if less than stoichiometric amounts of water are used, the foam is more crosslinked and firmer, but has lower elongation and higher density. A large excess of water, they observe, will use up the free isocyanate groups, leaving insufficient isocyanate available for effective crosslinking and resulting in the formation of many free amino end groups. As water content increases, the foam density decreases and above 30–50% excess water over stoichiometry results in a marked decrease in physical properties.

The dramatic way in which the addition of water influences practice of the present invention is seen by consideration of the Water Index:

$$\frac{\text{equivalents of H}_2\text{O} \times 100}{\text{equivalents of NCO}} = \text{Water Index Value}$$

Here one must keep in mind that in polyurethane foaming reactions one mole of water ultimately consumes two NCO groups, i.e. 1.0 mole $H_2O$ (2 equivalents OH) which react with 2 equivalents of NCO. A Water Index Value of 100 indicates the equivalents of water and equivalents of isocyanate are balanced. An Index of 95 indicates that there is a 5% shortage of water equivalents while an Index of 105 indicates a 5% surplus of water equivalents. A slight shortage of water equivalents (i.e. a slight excess of isocyanate), usually 3–5%, is common practice in the prior art, particularly with flexible foams.

Using the present resin reactant and water in amounts from about 0.5 mole $H_2O$/mole NCO groups ($H_2O$ Index Value of 100) up to about 2 moles $H_2O$/mole NCO groups ($H_2O$ Index Value of 400) results in poor foaming unless materials such as surfactants and catalysts or the like are included. Amounts up to about 2 moles $H_2O$/mole NCO ($H_2O$ Index Value of 400) require a catalyst. When using about 6.5 moles $H_2O$ mole/NCO groups ($H_2O$ Index Value of 1300) up to about 390 moles $H_2O$/mole NCO groups, ($H_2O$ Index Value 78,000) surprisingly good foams result which improve in characteristics with added amounts of molar water. Thus, the available water content in the aqueous reactant is from about 6.5 to about 390 moles $H_2O$/NCO groups in the resin reactant, i.e. an $H_2O$ Index Value of about 1300 to about 78,000 and desirably from about 4,000 to about 40,000, i.e. about 20 to about 200 moles $H_2O$/NCO groups.

"Available water" in the aqueous reactant is that water accessible for reaction with the resin reactant, and which is exclusive of water which may layer during reaction, or supplemental water which may be necessary because of further water-absorbtive or water-binding components or additives present in and forming the aqueous reactant.

The use of large molar excesses of water in the aqueous reactant leads to several important advantages and improvements over the conventional flame retardant polyurethane foam compositions. For example, in conventional polyurethane foam compositions, the water concentration must be carefully controlled to near the theoretical amount, usually an amount much less than about an H$_2$O Index Value of 400 (2.0 moles H$_2$O/NCO groups in the polyurethane reaction components) and the flame retardants must be separately included. This low concentration dictates the use of a catalyst to promote the rate of the polymerization foaming reaction, and requires an intensive mixing step to achieve good mixing of reactants and catalyst so as to insure a controllable and uniform cellular product, other additives are avoided. In contrast, the present invention requires very large but controlled excess of water, e.g., typically about an H$_2$O Index Value of about 1300 to about 78,000. Using this technique, the product quality and uniformity is not highly sensitive to accuracy of metering or mixing of the aqueous reactant and the use of a polymerization catalyst or promoter is optional. Thus, the present additives are included in the polyurethane structure at the time of foaming.

The hydrophilic foams of the present invention may be formulated so as to be flexible, semi-rigid or rigid in nature and to be of primarily open cell or primarily closed cell structure as desired.

Because the present polyurethane composition is characterized with high flame retardancy, and low smoke value, it may be used for cushioning for furniture and transportation vehicles, mattresses, foamed coating for covers and pads, upholstery fabrics, mattress ticking, sound absorbing wall coverings, carpet and rug under padding, and the like. Numerous additional uses will become obvious to those skilled in the art.

EXAMPLE 1

A prepolymer is prepared from 2 moles of polyethylene glycol 1000, one mole of trimethylolpropane and 7.7 moles of the commercial 80/20 mixture of 2,4 and 2,6-tolyldiisocyanate. 200 grams of the prepolymer, 2 grams of silicone surfactant L-520 by Union Carbide were mixed. To this was next added 200 grams of water, the mixture was stirred with a motor driven propeller blade. After creaming, the material was added to a 6"×6"×6" open box. The sample was demolded after ten minutes, dried with the oven at 70° C. for 16 hours and then equilibrated at 25° C. in a room at 50% relative humidity for 24 hours. The oxygen index value by the standard test was found to be 22.6%.

EXAMPLE 2

The procedure of Example 1 was repeated starting with 200 grams of the prepolymer of Example 1, 1 gram silicone surfactant, 0.1 grams of Calcatone blue pigment in one phase and 200 grams of calcium carbonate and 200 grams of water in the other phase. The oxygen index value taken on a vertically sectioned sample was 22.3%. A similar value was taken on a horizontally sectioned sample.

EXAMPLE 3

The procedure of Example 2 was repeated except using 100 parts by weight of the prepolymer resin, one part of silicone surfactant L-520 by Union Carbide and the aqueous phase contained 200 parts water and 200 parts calcium carbonate. The oxygen index value was 30.2% for a vertical section and 30.8% for a horizontal section.

EXAMPLE 4

The procedure of Example 1 was repeated except using 100 parts by weight of prepolymer, 1 part by weight L-520 silicone surfactant, 0.1 part by weight Calcatone Blue coloring, 200 parts by weight water. The water portion further included 200 parts by weight of alumina trihydrate and 22.2 parts of Phoschek P/30 by Monsanto. The oxygen index value was found to be 70.2% for both vertical and horizontal sections.

EXAMPLE 5

The procedure of Example 4 was repeated except 22.2 parts by weight of polyphosphate, Phosgard C-22-R and 2 parts by weight of Sb$_2$O$_3$ were used in place of the Phoschek P/30. The oxygen index was 69.9%.

EXAMPLE 6

The procedure of Example 4 was repeated except using 12 parts by weight of ammonium caseinate as a dispersing agent for the aluminum hydrate. The prepared foam had an oxygen index value of about 62%.

EXAMPLE 7

The procedure of Example 1 was repeated except using 100 parts by weight of the prepolymer resin and one part of silicone surfactant (L-520, Union Carbide) and ten parts of dimethylmethyl phosphonate, [(CH$_3$O)$_2$P(O)CH$_3$]. The aqueous phase contained 100 g of water, 150 g of hydrated alumina (Al(OH)$_3$). The oxygen index of the foam was 37.5%.

EXAMPLE 8

The procedure of Example 7 was repeated except 5 parts of magnesium ammonium phosphate was substituted for the dimethylmethylphosphonate. The oxygen index of this foam was 46%.

EXAMPLE 9

The procedure of Example 7 was repeated except the phosphonate was replaced with 5 parts of the chlorinated polyphosphate (Phosgard C-22-R, Monsanto). The oxygen index of this foam was 27.2%.

EXAMPLE 10

The procedure of Example 7 was repeated except the phosphonate was replaced with 5 parts of Tris-2,3-dibromopropylphosphate. The oxygen index of the resulting foam was 28.1%.

EXAMPLE 11

The procedure of Example 7 was repeated except 5 parts dimethylhydroxyethylphosphonate was substituted for dimethylmethylphosphonate to make a foam with an OI of 27.7%.

EXAMPLE 12

The procedure of Example 7 was repeated except the phosphonate was substituted with an oligomer formed by condensing dimethylhydroxyethyl phosphonate with the elimination of methanol. This product, a polyphosphonate, used at the 5% level gave a foam with an OI of 28.1%.

EXAMPLE 13

The procedure of Example 7 was repeated except the phosphonate was replaced with 10 parts of tris-β-chloroethylphosphate and the surfactant was Antaron FC30 rather than L-520. The foam has an oxygen index of 35.0%.

EXAMPLE 14

The procedure of Example 13 was repeated except the phosphate was replaced by 10 parts of a chlorinated polyphosphate, Phosgard 2XC-20 (Monsanto). This compound has the formula:

$$(ClC_2H_4O)_2P(O)OCH_2C(CH_2Cl)_2CH_2OP(O)(OC_2H_4Cl)_2.$$

The resulting foam has an oxygen index of 33.5%.

EXAMPLE 15

The procedure of Example 13 was repeated except the phosphate was replaced by 10 parts of tris-dichloropropyl phosphate. The foam had an oxygen index of 32.7%.

EXAMPLE 16

The procedure of Example 7 was repeated except the phosphonate was replaced by 10 parts of dimethylhydroxyisopropylphosphonate. The foam had an oxygen index of 35.4%.

EXAMPLE 17

The procedure of Example 7 was repeated except the phosphonate was replaced by 2 parts of red phosphorus. The foam had an oxygen index of 35.4%.

EXAMPLE 18

The procedure of Example 7 was repeated except the hydrated alumina was replaced with 150 parts of ammonium oxalate monohydrate and the phosphonate was replaced with 10 parts of ammonium polyphosphate. The resulting foam had an oxygen index of 47%.

EXAMPLE 19

The procedure of Example 2 was repeated except that the calcium carbonate was replaced with 150 parts of melamine oxalate. The resulting foam had an oxygen index of 30%.

It is understood that the foregoing detailed description is given merely by way of illustration and that many variations may be made therein without departing from the spirit of this invention.

What is claimed is:

1. A flame retardant hydrophilic polyurethane foam comprising the reaction product of (a) a hydrophilic, NCO terminated, polyoxyalkylene urethane prepolymer wherein at least 40 mole percent of the oxyalkylene units in the prepolymer are oxyethylene units; and (b) water; wherein sufficient amounts of (b) are added to provide an H$_2$O Index Value of from about 1,300 to about 78,000 and said reaction product containing from about 45 to about 70 weight percent alumina hydrate and from about 2 to about 20 weight percent of a phosphorous containing fire retardant material, said weight percent being based on the total dry weight of the foam.

2. A polyurethane foam as in claim 1 wherein the phosphorus containing fire retardant material is ammonium polyphosphate.

3. A polyurethane foam as in claim 1 wherein the phosphorus containing fire retardant material has the following formula:

$$(CH_3O)_2P(O)CH_3$$

4. A polyurethane foam as in claim 1 wherein the phosphorus containing fire retardant material is tris-2,3-dibromopropylphosphate.

5. A polyurethane foam as in claim 1 wherein the phosphorus containing fire retardant material is dimethylhydroxyethylphosphonate.

6. A polyurethane foam as in claim 1 wherein the phosphorus containing fire retardant material is tris-$\beta$-chloroethylphosphate.

7. A polyurethane foam as in claim 1 wherein the phosphorus containing fire retardant material has the following formula:

$$(ClC_2H_4O)_2P(O) \; OCH_2C(CH_2Cl)_2CH_2OP(O)(OC_2H_4Cl)_2$$

8. A polyurethane foam as in claim 1 wherein the phosphorus containing fire retardant material is tris-dichloropropylphosphate.

9. A polyurethane foam as in claim 1 wherein the phosphorus containing fire retardant material is dimethylhydroxyisopropylphosphonate.

10. A polyurethane foam as in claim 1 wherein the phosphorus containing fire retardant material is red phosphorus.

11. A polyurethane foam as in claim 1 wherein the phosphorus additive is non-halogenated.

12. A polyurethane foam as in claim 1 wherein the phosphorous containing fire retardant material has the following formula:

$$(C_2H_5O)_2 \; P(O)CH_2N(CH_2CH_2OH)_2$$

13. A polyurethane foam as in claim 1 wherein the phosphorous containing fire retardant material has the following formula:

$$\begin{array}{c} ClCH_2CH_2 \\ | \\ (ClCH_2CH_2O) \; P(O) \; OCH(CH_3) \\ OCH_2CH_2Cl \\ | \\ [P(O)OCH(CH_3)]_n\text{—}P(O) \; (OCH_2CH_2Cl)_2 \end{array}$$

14. A method of forming a flame retardant hydrophilic polyurethane foam which comprises admixing (a) a hydrophilic, NCO terminated, polyoxyalkylene urethane prepolymer wherein at least 40 mole percent of the oxyalkylene units in the prepolymer are oxyethylene units; (b) alumina hydrate; (c) a phosphorous containing fire retardant material; and (d) water in sufficient amounts as to provide an H$_2$O Index Value of from about 1,300 to about 78,000 and from 45 to about 70 weight percent alumina hydrate and from about 2 to about 20 weight percent of said phosphorous containing fire-retardant material, said weight percent based on the total dry weight of the resulting foam.

15. A method as in claim 14 wherein the phosphorus containing fire retardant material is non-halogenated.

16. A method as in claim 14 wherein the phosphorus containing fire retardant material is ammonium polyphosphate.

17. A method as in claim 14 wherein the phosphorus containing fire retardant material has the following formula:

$$(CH_3O)_2P(O)CH_3$$

18. A method as in claim 14 wherein the phosphorus containing fire retardant material is tris-2,3-dibromopropylphosphate.

19. A method as in claim 14 wherein the phosphorus containing fire retardant material is dimethylhydroxyethylphosphonate.

20. A method as in claim 14 wherein the phosphorus containing fire retardant material is tris-$\beta$-chloroethylphosphate.

21. A method as in claim 14 wherein the phosphorus containing fire retardant material has the following formula:

$$(ClC_2H_4O)_2P(O)\ OCH_2C(CH_2Cl)_2CH_2OP(O)(OC_2H_4Cl)_2$$

22. A method as in claim 14 wherein the phosphorus containing fire retardant material is tris-dichloropropylphosphate.

23. A method as in claim 14 wherein the phosphorus containing fire retardant material is dimethylhydroxyisopropylphosphonate.

24. A method as in claim 14 wherein the phosphorus containing fire retardant material is red phosphorus.

25. The method of claim 14 wherein a dispersing or emulsifying agent is included with the aluminum hydrate and phosphorus containing fire retardant material.

26. The method as in claim 14 wherein the phosphorous containing fire retardant material has the following formula:

$$(C_2H_5O)_2P(O)CH_2N(CH_2CH_2OH)_2$$

27. A method as in claim 14 wherein the phosphorous containing fire retardant material has the following formula:

$$(ClCH_2CH_2O)\ \overset{\overset{\displaystyle ClCH_2CH_2}{|}}{P(O)}\ OCH(CH_3)$$
$$\overset{\overset{\displaystyle OCH_2CH_2Cl}{|}}{[P(O)OCH(CH_3)]_n} - P(O)\ (OCH_2CH_2Cl)_2$$

* * * * *

UNITED STATES PATENT AND TRADEMARK OFFICE
CERTIFICATE OF CORRECTION

PATENT NO. : 4,165,411

DATED : August 21, 1979

INVENTOR(S) : Nelson Samuel Marans, Clifton Leroy Kehr and Robert Matthews Murch It is certified that error appears in the above-identified patent and that said Letters Patent are hereby corrected as shown below:

In Example 14 in column 11, correct the formula to read:

$$(ClC_2H_4O)_2P(O)OCH_2C(CH_2Cl)_2CH_2OP(O)(OC_2H_4Cl)_2$$

In claims 7 and 21 correct the formula to read:

$$(ClC_2H_4O)_2P(O)\ OCH_2C(CH_2Cl)_2CH_2OP(O)\ (OC_2H_4Cl)_2$$

In claims 13 and 27 correct the formula to read:

$$\underset{(ClCH_2CH_2O)}{\overset{Cl\ CH_2CH_2}{|}}P(O)\ OCH(CH_3)\ [\overset{OCH_2CH_2Cl}{\underset{|}{P(O)OCH(CH_3)}}]_n-P(O)\ (OCH_2CH_2Cl)_2$$

*Signed and Sealed this*

Twelfth Day of August 1980

[SEAL]

Attest:

Attesting Officer

SIDNEY A. DIAMOND

Commissioner of Patents and Trademarks